UNITED STATES PATENT OFFICE.

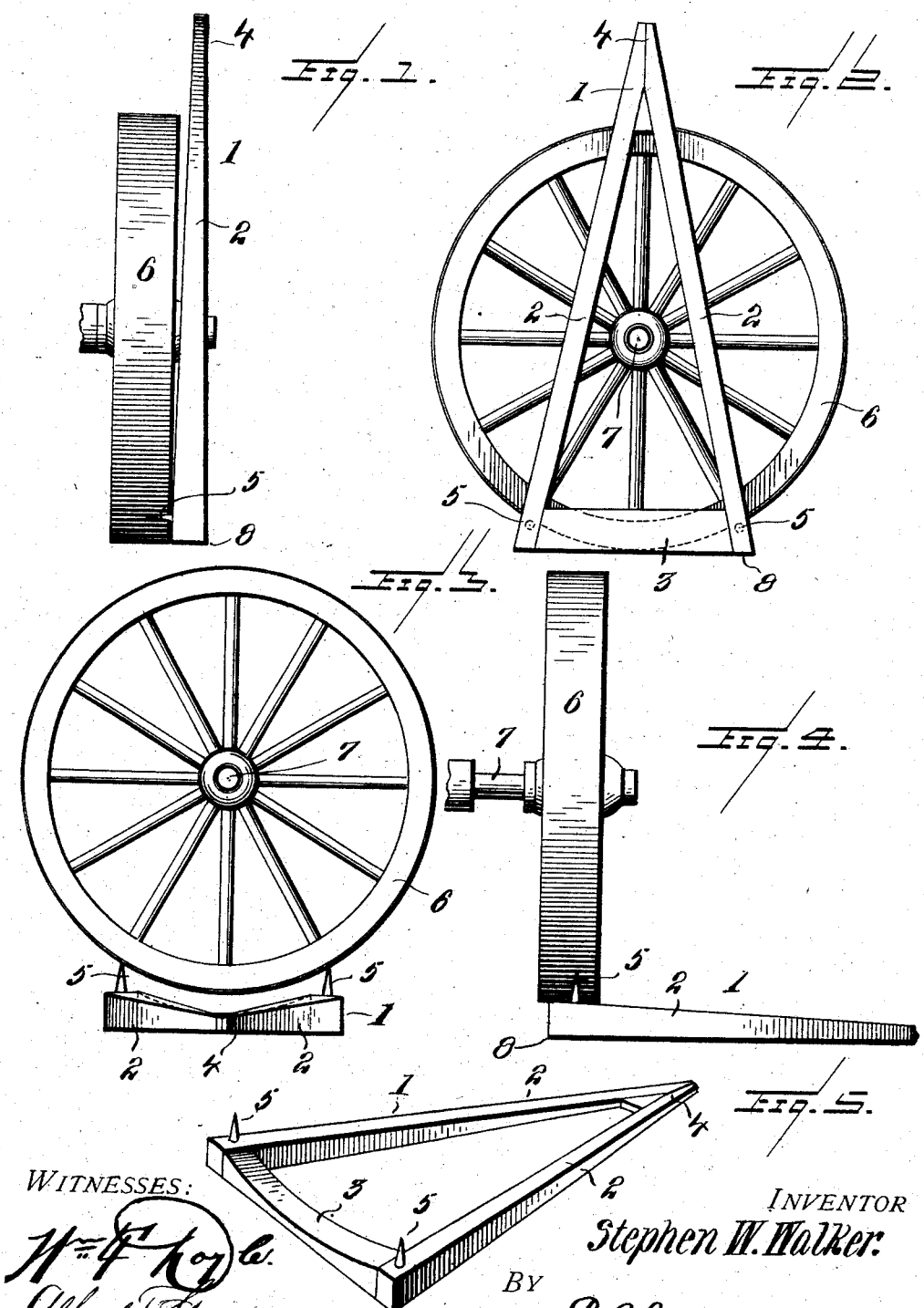

STEPHEN W. WALKER, OF ANSON, MAINE, ASSIGNOR OF ONE-HALF TO JOHN W. HANNAGAN, OF MADISON, MAINE.

WHEEL-JACK.

No. 878,580.     Specification of Letters Patent.     Patented Feb. 11, 1908.

Application filed July 25, 1907. Serial No. 385,478.

*To all whom it may concern:*

Be it known that I, STEPHEN W. WALKER, a citizen of the United States, residing at Anson, county of Somerset, and State of Maine, have invented certain new and useful Improvements in Wheel-Jacks, of which the following is a specification, reference being had therein to the accompanying drawing.

This invention relates to a wheel jack, and particularly to a structure for raising a vehicle wheel and drawing it longitudinally along the axle upon which it is mounted.

The invention has for an object to provide a novel and improved construction of hand lever having laterally disposed projections adapted to engage the periphery of the wheel so as to lift the wheel and simultaneously draw it longitudinally outward upon the vehicle axle to permit the lubrication of the axle while the wheel is in such position, and the return movement of the lever restores the wheel to its normal position.

Other and further objects and advantages of the invention will be hereinafter fully set forth and the novel features thereof defined by the appended claims.

In the drawings:—Figure 1 is a side elevation with the lever in position for use; Fig. 2 is a front elevation of Fig. 1; Fig. 3 is a similar view with the lever depressed to raise the wheel; Fig. 4 is a side elevation of the wheel raised, and Fig. 5 is a detail perspective of the jack.

Like numerals refer to like parts in the several views of the drawings.

Referring to the drawing, the numeral 1 designates the jack which may be of any desired size or configuration, a convenient form thereof being a triangle comprising the hand levers 2 connected at one end by a base piece 3 which may, if desired, be concaved to accommodate the curvature of the wheel and to permit the use of a short projection on the lever. The opposite ends of the hand levers 2 are connected together as at 4, and each of these levers is provided at its base end with the projection 5 to engage the vehicle wheel tire, which may be sharpened or otherwise formed to prevent slipping thereof. The wheel 6 is mounted upon the axle 7 of usual construction and when slid longitudinally thereon as shown in Fig. 4 a space is provided to permit the lubrication of the axle.

In the operation of the invention the jack is placed parallel to the face of the wheel, as shown in Fig. 1 with the projections disposed at opposite sides of the wheel hub. The lever is then drawn downward so that the point 8 thereof acts as a pivot which thereby raises the wheel from the ground and simultaneously draws it outward into the position shown in Fig. 4 where, the weight of the wheel being directly downward upon the base piece of the jack, the parts are held during the lubricating action. The weight of the wheel also causes the projections to impinge upon the tire and thus frictionally hold the wheel against slipping during the outward movement thereof on the vehicle axle. The invention therefore presents a simple, very efficient and economically constructed form of wheel jack by which the wheel can be moved longitudinally upon its axle for the purpose of lubricating the latter without the necessity of jacking up the axle and completely removing the wheel therefrom as in the return of the lever from the horizontal to the vertical position the wheel is restored to the position shown in Fig. 1.

Having described my invention and set forth its merits, what I claim and desire to secure by Letters Patent is:—

1. A wheel jack comprising a handle lever having at its base a pivoting edge and provided upon its opposite face with separated lateral projections disposed to travel in an arc beyond a vertical line from said pivot in the oscillation of the lever thereon.

2. A wheel jack comprising a handle lever having an angular pivoting edge provided upon its opposite face with separated lateral projections disposed intermediate of the pivoting edge and the opposite end of the lever.

3. A wheel jack comprising a handle lever having at its base a pivoting edge and provided upon its opposite face with lateral prongs spaced from each other, and disposed to travel in an arc beyond a vertical line from said pivot.

4. A wheel jack comprising a handle lever having at its base a pivoting edge and provided upon its opposite face with lateral prongs spaced from each other, and disposed to travel in an arc beyond a vertical line from said pivot and a base piece extending between said prongs and having a concave upper face intermediate thereof.

5. In a wheel jack, a handle lever comprising a triangular frame the base of which is formed with an angular pivoting edge throughout its length, and pins upon the opposite face of the base from said edge and spaced at the opposite ends of the base.

In testimony whereof I affix my signature in presence of two witnesses.

STEPHEN W. WALKER.

Witnesses:
S. E. REMICK,
HARRY MERRITHEN.